US010008938B2

(12) United States Patent
Fujihata et al.

(10) Patent No.: US 10,008,938 B2
(45) Date of Patent: Jun. 26, 2018

(54) POWER CONVERSION DEVICE

(71) Applicant: OMRON Corporation, Kyoto (JP)

(72) Inventors: Isao Fujihata, Matsumoto (JP);
Masayuki Suetomi, Yokohama (JP);
Kesanobu Kuwabara, Azumino (JP);
Makoto Ohashi, Uji (JP); Yoshihiko
Yamaguchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days. days.

(21) Appl. No.: 15/584,039

(22) Filed: May 2, 2017

(65) Prior Publication Data
US 2017/0324334 A1 Nov. 9, 2017

(30) Foreign Application Priority Data

May 9, 2016 (JP) .................. 2016-093908
Mar. 10, 2017 (JP) .................. 2017-045665

(51) Int. Cl.
H02M 7/162 (2006.01)
H02M 3/24 (2006.01)
H02M 1/08 (2006.01)
H02M 1/00 (2006.01)

(52) U.S. Cl.
CPC ............... H02M 3/24 (2013.01); H02M 1/08 (2013.01); H02M 2001/0009 (2013.01)

(58) Field of Classification Search
CPC . H02M 7/162; H02M 3/24; H02M 2001/0009
USPC ...... 363/15, 17, 21.02–21.18, 22–27, 44–48, 363/52–53, 123, 125–127
See application file for complete search history.

(56) References Cited

U.S. PATENT DOCUMENTS 5,157,592 A * 10/1992 Walters ................ G05F 1/38
363/132
5,539,630 A * 7/1996 Pietkiewicz ...... H02M 3/33576
363/132

(Continued)

FOREIGN PATENT DOCUMENTS

JP 2015517788 6/2015

OTHER PUBLICATIONS

"Search Report of Europe Counterpart Application", dated Sep. 7, 2017, p. 1-p. 10.

Primary Examiner — Adolf Berhane
Assistant Examiner — Nusrat Quddus
(74) Attorney, Agent, or Firm — JCIPRNET

(57) ABSTRACT

A power conversion device, which includes an insulation type full bridge converter and can switch a power transmission direction at a high speed, is provided. A DC/DC converter (10) constitutes a power conversion device, which operates as a first type converter that converts a voltage within a first range applied to a first input/output terminal pair into a voltage within a second range and outputs the voltage from a second input/output terminal pair or a second type converter that converts a voltage within the second range applied to the second input/output terminal pair into a voltage within the first range and outputs the voltage from the first input/output terminal pair, as a device in which a direction of a current flowing through a winding of a transformer (TR) is switched after a magnitude of the current flowing through the winding of the transformer (TR) reaches "0."

4 Claims, 13 Drawing Sheets

(56) References Cited

U.S. PATENT DOCUMENTS

| | | | | |
|---|---|---|---|---|
| 5,886,884 A | * | 3/1999 | Baek | H02M 1/14 363/17 |
| 6,341,078 B1 | * | 1/2002 | Miller | H02M 7/5387 363/132 |
| 7,869,237 B1 | * | 1/2011 | Schutten | H02M 3/33569 363/132 |
| 8,378,646 B2 | * | 2/2013 | Shimada | H02M 3/33507 307/66 |
| 2013/0308344 A1 | | 11/2013 | Rosado et al. | |
| 2013/0314950 A1 | | 11/2013 | Hembach et al. | |
| 2016/0087545 A1 | | 3/2016 | Higaki et al. | |

* cited by examiner

POWER CONVERSION DEVICE

CROSS-REFERENCE TO RELATED APPLICATION

This application claims the priority benefits of Japan application serial no. 2016-093908, filed on May 9, 2016, and Japan application serial no. 2017-045665, filed on Mar. 10, 2017. The entirety of each of the above-mentioned patent applications is hereby incorporated by reference herein and made a part of this specification.

BACKGROUND OF THE INVENTION

Field of the Invention

The present invention relates to a power conversion device, and more particularly to a power conversion device having a function of converting a voltage within a first range applied to a first input/output terminal pair into a voltage within a second range and outputting the voltage from a second input/output terminal pair and a function of converting a voltage within the second range applied to the second input/output terminal pair into a voltage within the first range and outputting the voltage from the first input/output terminal pair.

Description of Related Art

As a bidirectional DC/DC converter in which large-capacity bidirectional DC conversion is possible, an insulation type bidirectional DC/DC converter (see, for example, Published Japanese Translation No. 2015-517788 of the PCT International Publication) having a configuration in which two full bridge circuits are connected via a transformer is known.

PRIOR ART DOCUMENT

Patent Document

[Patent Document 1] Japanese Unexamined Patent Application Publication No. 2015-517788

SUMMARY OF THE INVENTION

If the insulation type bidirectional DC/DC converter (hereinafter referred to as insulation type full bridge converter) having the above configuration performs a step-up operation or a step-down operation, ON/OFF of four switching elements in a full bridge circuit of a primary side is controlled so that a state in which a direction of a current flowing through a winding of the primary side of the transformer is a first direction and a state in which a direction of a current is a second direction opposite to the first direction alternate. Transition timings between the above-described two states when the insulation type full bridge converter performs a step-up operation or a step-down operation are determined irrespective of an amount (magnitude) of the current flowing through the winding of the primary side of the transformer. Thus, if a power transmission direction from the insulation type full bridge converter is switched (if input/output terminals previously functioning as input terminals function as output terminals), it is necessary to wait for a certain period of time (a required time in which a current flowing through each winding of the transformer reaches "0") for protection of an element in the converter or the like.

The present invention has been made in view of the above-described circumstances, and an objective of the present invention is to provide a power conversion device which includes an insulation type full bridge converter and can switch a power transmission direction at a high speed (in a short time).

In order to achieve the above-described objective, a power conversion device of the present invention includes a DC/DC converter connected to a first input/output terminal pair and a second input/output terminal pair; and a control unit configured to control the DC/DC converter, wherein the DC/DC converter includes a first switching leg having first and second switching elements connected in series via a first connection point and connected to the first input/output terminal pair; a second switching leg having third and fourth switching elements connected in series via a second connection point and connected in parallel to the first switching leg; a third switching leg having fifth and seventh switching elements connected in series via a third connection point and connected to the second input/output terminal pair; a fourth switching leg having sixth and eighth switching elements connected in series via a fourth connection point and connected in parallel to the third switching leg; a first energy storage and conversion unit connected to the first connection point and the second connection point and connected to one winding of a transformer and a first reactor connected in series; and a second energy storage and conversion unit connected to the third connection point and the fourth connection point and connected to the other winding of the transformer and a second reactor connected in series, wherein the control unit is able to execute a first control for causing the DC/DC converter to convert a voltage within a first range applied to the first input/output terminal pair into a voltage within a second range and to output the voltage within the second range from the second input/output terminal pair and a second control for causing the DC/DC converter to convert a voltage within the second range applied to the second input/output terminal pair into a voltage within the first range and to output the voltage within the first range from the first input/output terminal pair, wherein the first control is a control for controlling ON/OFF of each switching element in the DC/DC converter so that a state of the DC/DC converter iteratively transitions between, in an order of, a first state in which a current input from the first input/output terminal pair flows through the first reactor, a second state in which a current is able to circulate along a path including the first reactor, a third state in which the current input from the first input/output terminal pair flows through the first reactor in a direction opposite to a direction in the first state, and a fourth state in which a current is able to circulate along a path including the first reactor while flowing through the first reactor in a direction opposite to a direction in the second state, wherein the second control is a control for controlling ON/OFF of each switching element in the DC/DC converter so that a state of the DC/DC converter iteratively transitions between, in an order of, a fifth state in which a current input from the second input/output terminal pair flows through the second reactor and no current is output from the first input/output terminal pair, a sixth state in which the current input from the second input/output terminal pair flows through the second reactor and a current is output from the first input/output terminal pair, a seventh state in which no current is input from the second input/output terminal pair and no current is output from the first input/output terminal pair, an eighth state in which the current input from the second input/output terminal pair flows through the second reactor in a direction opposite to a direction in the fifth state and no current is output from the first input/output terminal pair, a ninth state in which the current input from the second input/output terminal pair flows through the second reactor in a direction opposite to a direction in the sixth state and a current is output from the first input/output terminal pair, and a tenth state in which no current is input from the second input/output terminal pair and no current is output from the first input/output terminal pair, and wherein a transition from the second state to the third state and a transition from the fourth state to the first state are configured to be performed when a magnitude of a current circulating along the path including the first reactor has reached "0."

That is, if the first input/output terminal pair side is an input side (a power supply side) in the power conversion device of the present invention, the transition from the second state to the third state and the transition from the fourth state to the first state are performed when the magnitude of the current circulating along the path including the first reactor has reached "0." Also, a "time at which the magnitude of the current has reached "0"" in the present invention may be a "time at which a result of detection of the magnitude of the current has reached "0" and a "time at which a sign of the current (a direction in which the current flows) has inverted."

In the power conversion device of the present invention, if the second input/output terminal pair side is the input side, ON/OFF of each switching element in the DC/DC converter is controlled so that the state of the DC/DC converter sequentially transitions between six states including a seventh state and a tenth state in which no current is input from the second input/output terminal pair and no current is output from the first input/output terminal pair under the second control. Accordingly, in the power conversion device of the present invention, it is unnecessary to wait for a current flowing through each winding of the transformer to be "0" when the power transmission direction is switched (when the input terminal pair is changed from the first input/output terminal pair to the second input/output terminal pair and when the input terminal pair is changed from the second input/output terminal pair to the first input/output terminal pair). Consequently, according to the power conversion device of the present invention, the power transmission direction can be switched at a higher speed (in a shorter time) than in a conventional power conversion device.

In the power conversion device of the present invention, a DC/DC converter may be configured so that the transition from the second state to the third state and transition from the fourth state to the first state are performed when the magnitude of the current circulating along the path including the first reactor has reached "0" in all operation conditions. Also, in the power conversion device of the present invention, under certain operation condition (most operation conditions among all operation conditions), a DC/DC converter configured so that transition from the second state to the third state and transition from the fourth state to the first state are performed when the magnitude of the current circulating along the path including the first reactor has reached "0" and a control unit configured to perform a control for causing the state of the DC/DC converter to transition from the second state to the third state after the magnitude of the current reaches "0" if the magnitude of the current circulating along the path including the first reactor has not reached "0" when the state of the DC/DC converter is to be transitioned from the second state to the third state and causing the state of the DC/DC converter to transition from the fourth state to the first state after the magnitude of the current reaches "0" if the magnitude of the current circulating along the path including the first reactor has not reached "0" when the state of the DC/DC converter is to be transitioned from the fourth state to the first state as first control may be adopted.

Also, in order to prevent the power conversion device from performing an erroneous operation due to erroneous detection of the timing at which the magnitude of the current reaches "0," the control unit may include an input terminal to which a signal indicating the magnitude of the current flowing through the first reactor is to be input, and the power conversion device of the present invention may further include a current value change unit configured to supply an output of a current sensor for measuring the magnitude of the current flowing through the first reactor to the input terminal of the control unit when a predetermined condition defined in advance as a condition that it is difficult to accurately detect that the magnitude of the current flowing through the first reactor has reached "0" is not satisfied and supply a signal indicating that the magnitude of the current flowing through the first reactor is "0" to the input terminal of the control unit if the predetermined condition is satisfied.

The current value change unit may include a control signal output circuit configured to output a control signal indicating whether or not the predetermined condition is satisfied on the basis of a value of a voltage input to the first input/output terminal pair and a value of a voltage output from the second input/output terminal pair, and a multiplexer configured to supply one of an output of the current sensor and a signal indicating that the magnitude of the current flowing through the first reactor is "0" to the input terminal of the control unit.

According to the present invention, it is possible to provide a power conversion device which includes an insulation type full bridge converter and can switch a power transmission direction at a high speed (in a short time).

DETAILED DESCRIPTION OF THE INVENTION

Hereinafter, embodiments of the present invention will be described with reference to the drawings.

First Embodiment

Figure 1:
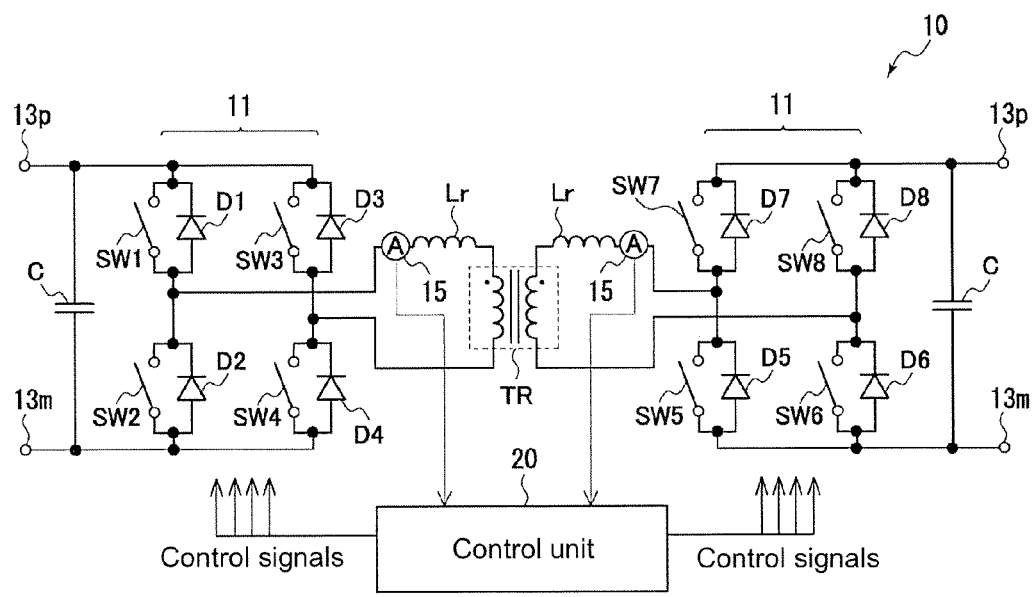
FIG. 1 is a schematic configuration diagram of a power conversion device according to a first embodiment of the present invention.

FIG. 1 is a schematic configuration diagram of a power conversion device according to the first embodiment of the present invention.

As illustrated, the power conversion device according to the present embodiment includes a DC/DC converter 10, a control unit 20, and two pairs of input/output terminals 13 (13p and 13m). In any pair of input/output terminals 13, the input/output terminal 13p is an input/output terminal of a high potential side and the input/output terminal 13m is an input/output terminal of a low potential side.

The DC/DC converter 10 is an insulation type bidirectional DC/DC converter including a transformer TR, two reactors Lr, and two full bridge circuits 11 as main components. Hereinafter, the full bridge circuit 11 on the left side and the full bridge circuit 11 on the right side in FIG. 1 are referred to as a first full bridge circuit 11 and a second full bridge circuit 11, respectively. Likewise, the reactors Lr on the left side and the right side in FIG. 1 are referred to as a first reactor and a second reactor, respectively, and a winding on the left side and a winding on the right side in the transformer TR in FIG. 1 are referred to as a first winding and a second winding, respectively. Also, the input/output terminals 13 (13p and 13m) on the left side and the right side in FIG. 1 are referred to as a first input/output terminal 13 and a second input/output terminal 13, respectively. The transformer TR of the DC/DC converter 10 may not have a turn ratio of 1:1. However, the configuration and operation of the power conversion device will be described below under the assumption that the turn ratio of the transformer TR is 1:1.

The first full bridge circuit 11 of the DC/DC converter 10 includes a first switching leg having a first switching element SW1 and a second switching element SW2 connected in series and a second switching leg having a third switching element SW3 and a fourth switching element SW4 connected in series. As illustrated, a diode Dn is connected in parallel between terminals of an $n^{th}$ switching element SWn (n=1 to 4) of each switching leg. Also, each switching leg is connected to a pair of first input/output terminals 13 and the connection point between the first and second switching elements SW1 and SW2 of the first switching leg is connected to one end of the first winding of the transformer TR via the first reactor. The connection point between the third and fourth switching elements SW3 and SW4 of the second switching leg is connected to the other end of the first winding of the transformer TR.

The second full bridge circuit 11 of the DC/DC converter 10 includes a third switching leg having a fifth switching element SW5 and a seventh switching element SW7 connected in series and a fourth switching leg having a sixth switching element SW6 and an eighth switching element SW8 connected in series. As illustrated, a diode Dn is connected in parallel between terminals of an $n^{th}$ switching element SWn (n=5 to 8) of each switching leg. Both the third switching leg and the fourth switching leg are connected to the second input/output terminal pair. The connection point between the fifth and seventh switching elements SW5 and SW7 of the third switching leg is connected to one end of the second winding of the transformer TR via the second reactor, and the connection point between the sixth and eighth switching elements SW6 and SW8 of the fourth switching leg is connected to the other end of the second winding of the transformer TR.

Two current sensors 15 for measuring the magnitude of the current flowing through each reactor Lr are attached to the DC/DC converter 10. Various sensors (not illustrated) for measuring magnitudes of an input/output voltage and an input/output current are also attached to the DC/DC converter 10.

The control unit 20 is a unit that controls the DC/DC converter 10 (ON/OFF of each switching element in the DC/DC converter 10) by changing the level of the control signal for each switching element in the DC/DC converter 10. Hereinafter, a control signal for the $n^{th}$ switching element SWn (n=1 to 8) is referred to as a control signal Gn.

The control unit 20 includes a processor (a microcontroller in the present embodiment), a gate driver, and the like, and outputs of the above-described various sensors (the current sensor 15 and the like) are input to the control unit 20.

Then, the control unit 20 determines whether to operate the DC/DC converter 10 as one of converters of the following four types on the basis of input data (a current value, a voltage value), and is configured (programmed) to control the DC/DC converter 10 so that the DC/DC converter operates as the determined converter.

- A step-up converter whose first input/output terminal 13 side is the primary side.
- A step-down converter whose first input/output terminal 13 side is the primary side.
- A step-up converter whose second input/output terminal 13 side is the primary side.
- A step-down converter whose second input/output terminal 13 side is the primary side.

Also, the control unit 20 is configured (programmed) so that a change in control details for the DC/DC converter 10 (a change from the control for causing the DC/DC converter 10 to operate as the step-up converter whose first input/output terminal 13 side is the primary side to the control for causing the DC/DC converter 10 to operate as the step-down converter whose second input/output terminal 13 side is the primary side, or the like) is immediately performed.

Hereinafter, the configuration and operation of the power conversion device according to the present embodiment will be specifically described.

First, details of basic control of the DC/DC converter 10 by the control unit 20 will be described. Details of the control performed on the second and first full bridge circuits 11 by the control unit 20 when the DC/DC converter 10 is operated as the step-up/step-down converter whose second input/output terminal 13 side is the primary side are the same as details of the control performed on the first and second full bridge circuits 11 by the control unit 20 when the DC/DC converter 10 is operated as the step-up/step-down converter whose first input/output terminal 13 side is the primary side. In other words, the control details of the control unit 20 when the DC/DC converter 10 is operated as the step-up/step-down converter whose second input/output terminal 13 side is the primary side are substantially the same as the control details of the control unit 20 when the DC/DC converter 10 is operated as the step-up/step-down converter whose first input/output terminal 13 side is the primary side. Thus, only the control details of the control unit 20 when the DC/DC converter 10 is operated as the step-up/step-down converter whose first input/output terminal 13 side is the primary side will be described.

Also, control signals G1 to G4 actually output by the control unit 20 are configured so that ON and OFF of the two switching elements (ON of the first switching element SW1, OFF of the second switching element SW2, and the like) are performed with a time difference (so-called dead time). However, the operation of the control unit 20 will be described below under the assumption that the time difference is not assigned to avoid complicated explanation.

Figure 2:
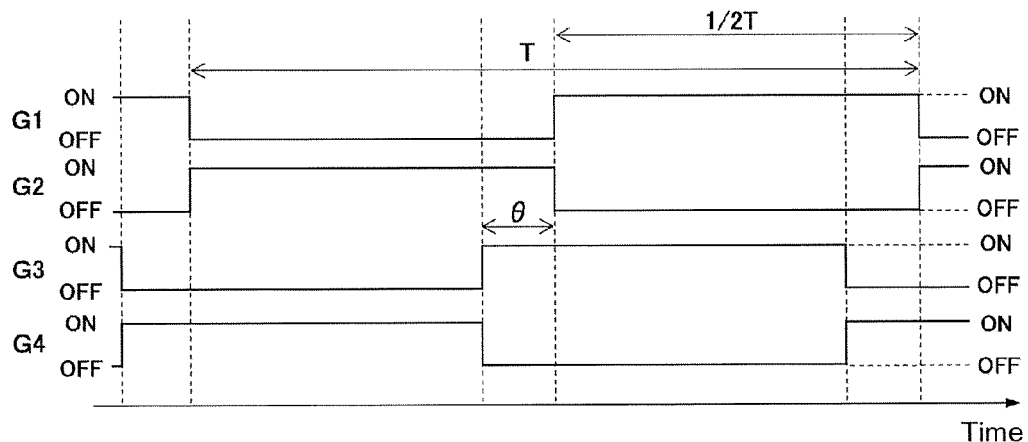
FIG. 2 is a timing chart of output control signals G1 to G4 when a control unit provided in the power conversion device according to the embodiment causes a DC/DC converter to operate as a step-down converter whose first input/output terminal side is a primary side.

(1) When the DC/DC converter 10 functions as a step-down converter whose first input/output terminal 13 side is the primary side:

In this case, the control unit 20 basically outputs control signals G1 to G4 which change with time as illustrated in FIG. 2.

In other words, when the DC/DC converter 10 functions as the step-down converter whose first input/output terminal 13 side is the primary side, the control unit 20 outputs the control signal G1 whose ON time is ½ of a period T, i.e., the control signal G1 having a duty ratio of ½. Also, the control unit 20 outputs the control signal G2 obtained by inverting the control signal G1, i.e., the control signal G2 by which the second switching element SW2 is turned OFF/ON when the first switching element SW1 is ON/OFF. Further, the control unit 20 outputs the control signal G3 whose phase is shifted by θ from the control signal G1 and the control signal G4 obtained by inverting the control signal G3.

Then, while the control signals G1 to G4 as described above are output, the control unit 20 changes the value of θ so that the output voltage or the output current of the DC/DC converter 10 become a target value.

Also, when the power conversion device according to the present embodiment operates as the step-down device whose first input/output terminal 13 side is the primary side, the second full bridge circuit 11 (the full bridge circuit 11 of the secondary side; see FIG. 1) is used as a full wave rectifier (diode bridge circuit). Accordingly, when the DC/DC converter 10 is operated as the step-down converter whose first input/output terminal 13 side is the primary side, the control unit 20 maintains the state of each switching element in the second full bridge circuit 11 in an OFF state.

Figure 3:
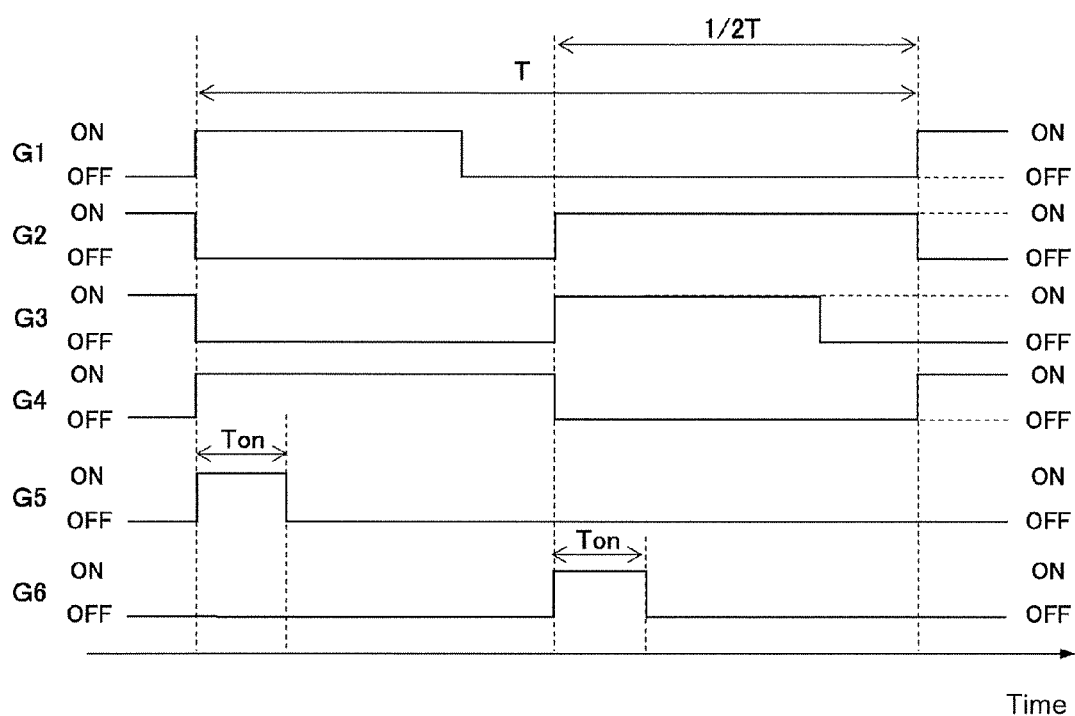
FIG. 3 is a timing chart of output control signals G1 to G6 when the control unit causes the DC/DC converter to operate as a step-up converter whose first input/output terminal side is a primary side.

(2) When the DC/DC converter 10 functions as a step-up converter whose first input/output terminal 13 side is the primary side:

In this case, the control unit 20 basically outputs the control signals G1 to G6 which change with time as illustrated in FIG. 3.

In other words, when the DC/DC converter 10 functions as the step-up converter whose first input/output terminal 13 side is the primary side, the control unit 20 outputs the control signal G2 having a duty ratio of ½ and the control signal G1 which rises at a falling edge time of the control signal G2 and has a shorter ON time than the control signal G2. Also, the control unit 20 outputs the control signals G3 and G4, which are signals obtained by delaying the control signals G1 and G2 by T/2, respectively. Further, the control unit 20 outputs the control signal G5 having a high level only during a time Ton from the falling edge time of the control signal G1 and the control signal G6 having a high level only during the time Ton from the falling edge time of the control signal G3.

Then, while the control signals G1 to G6 as described above are output, the control unit changes a value of the time Ton so that the output voltage or the output current of the DC/DC converter 10 becomes the target value.

Hereinafter, details of control of the DC/DC converter 10 by the control unit 20 will be more specifically described.

Figure 4:
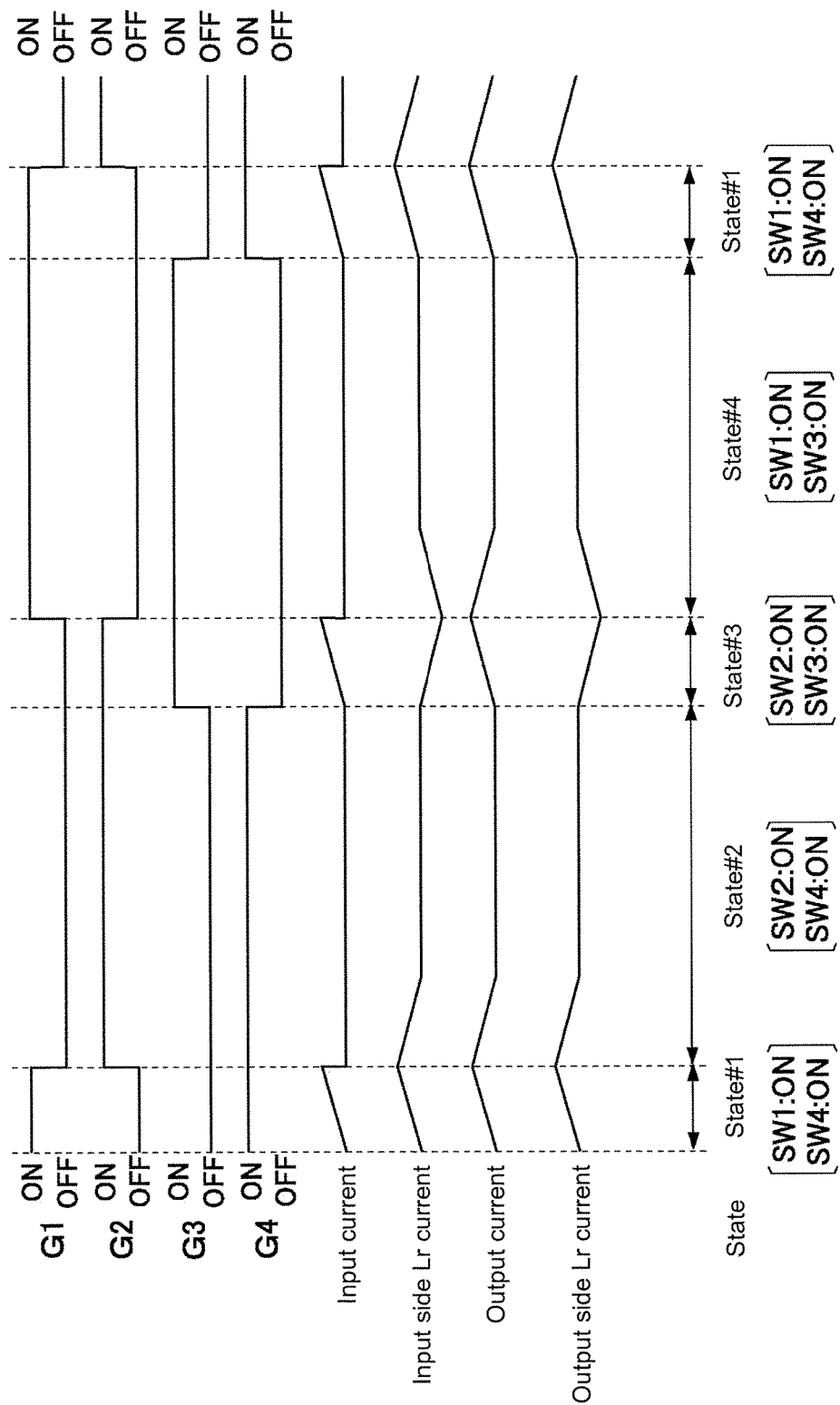
FIG. 4 is a time chart illustrating changes in currents flowing through parts of the DC/DC converter with respect to time when the control unit causes the DC/DC converter 10 to function as a step-down converter whose first input/output terminal side is the primary side together with changes in the control signals G1 to G4 with respect to time.

(1) When the DC/DC converter 10 functions as a step-down converter whose first input/output terminal 13 side is the primary side:

FIG. 4 illustrates changes in currents flowing through parts of the DC/DC converter 10 with respect to time when the control unit 20 causes the DC/DC converter 10 to function as the step-down converter whose first input/output terminal 13 side is the primary side together with changes in the control signals G1 to G4 with respect to time. Also, FIGS. 5A to 5F are explanatory diagrams illustrating current paths of a primary side and a secondary side of the DC/DC converter 10 when the control unit 20 causes the DC/DC converter 10 to function as the step-down converter whose first input/output terminal 13 side is the primary side. Also, in FIG. 4 and FIG. 8 described below, an "input current" and an "output current" are a current flowing into the first input/output terminal 13p and a current flowing out from the second input/output terminal 13p, respectively. Also, an "input side Lr current" and an "output side Lr current" are a current flowing through the first reactor (the reactor Lr of the primary side) and a current flowing through the second reactor (the reactor Lr of the secondary side).

As described above, if the DC/DC converter 10 is operated as the step-down converter whose first input/output terminal 13 side is the primary side, the control unit 20 outputs the control signals G1 to G4 that change with time as illustrated in FIG. 4.

Accordingly, if the control unit 20 operates the DC/DC converter 10 as the step-down converter whose first input/output terminal 13 side is the primary side, the state of the DC/DC converter 10 iteratively transitions in the order of state #1, state #2, state #3, and state #4 between the following four states.

State #1: a state in which the first switching element SW1 and the fourth switching element SW4 are ON (the first switching element SW1 and the fourth switching element SW4 are ON and the other switching elements are OFF; this is the same in the following).
State #2: a state in which the second switching element SW2 and the fourth switching element SW4 are ON.
State #3: a state in which the second switching element SW2 and the third switching element SW3 are ON.
State #4: a state in which the first switching element SW1 and the third switching element SW3 are ON.

Figure 5A:
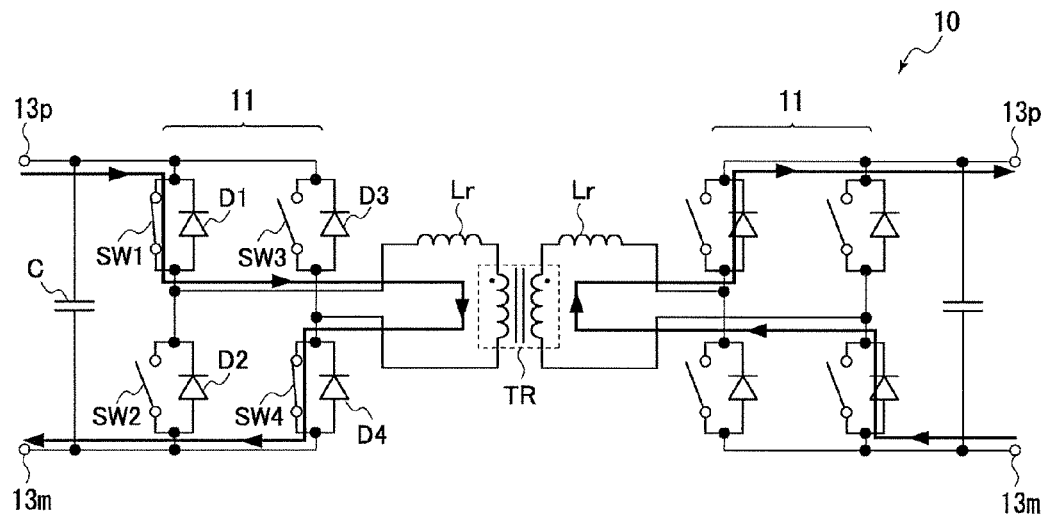
FIG. 5A is an explanatory diagram illustrating current paths of a primary side and a secondary side of the DC/DC converter when the control unit causes the DC/DC converter to function as a step-down converter whose first input/output terminal side is the primary side.

When the state of the DC/DC converter 10 is in state #1, as illustrated in FIG. 5A, a current flows through a path of first input/output terminal 13p→first switching element SW1→first reactor→transformer TR→fourth switching element SW4→first input/output terminal 13m. Accordingly, energy is stored in the first reactor and the input side Lr current rises as illustrated in FIG. 4. Also, energy is transmitted to the secondary side via the transformer TR and rectified by the second full bridge circuit 11 and output from the second input/output terminal 13 as illustrated in FIGS. 4 and 5A.

Figure 5B:
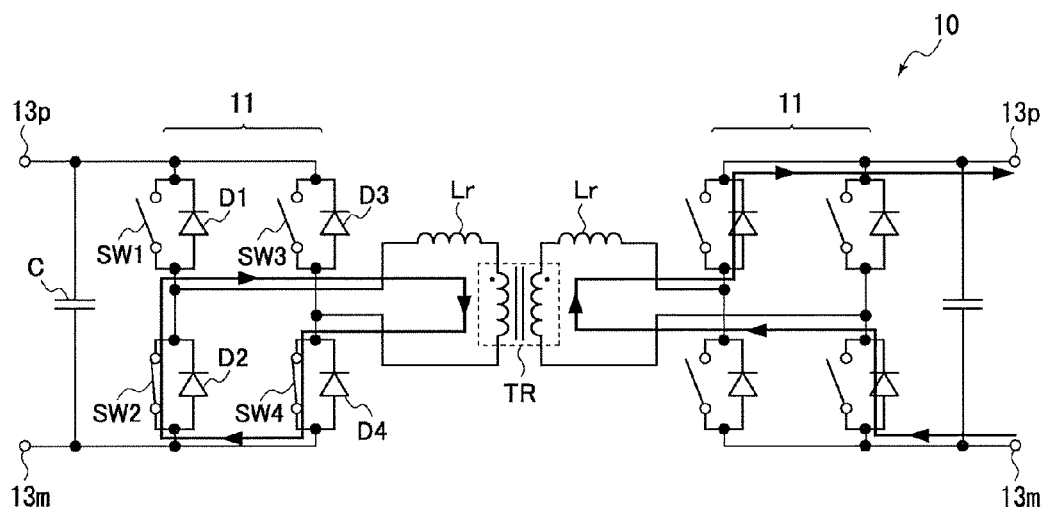
FIG. 5B is an explanatory diagram of the current paths of the primary side and the secondary side of the DC/DC converter following FIG. 5A.

When the state of the DC/DC converter 10 transitions to state #2, the first switching element SW1 is OFF and the second switching element SW2 is ON. Accordingly, as illustrated in FIG. 5B, a current circulates along a path of second switching element SW2 (and diode D2)→first reactor→transformer TR→fourth switching element SW4 according to energy stored in the first reactor. As a result, the energy stored in the first reactor is transmitted to the secondary side, rectified by the second full bridge circuit 11, and output from the second input/output terminal 13.

Figure 5C:
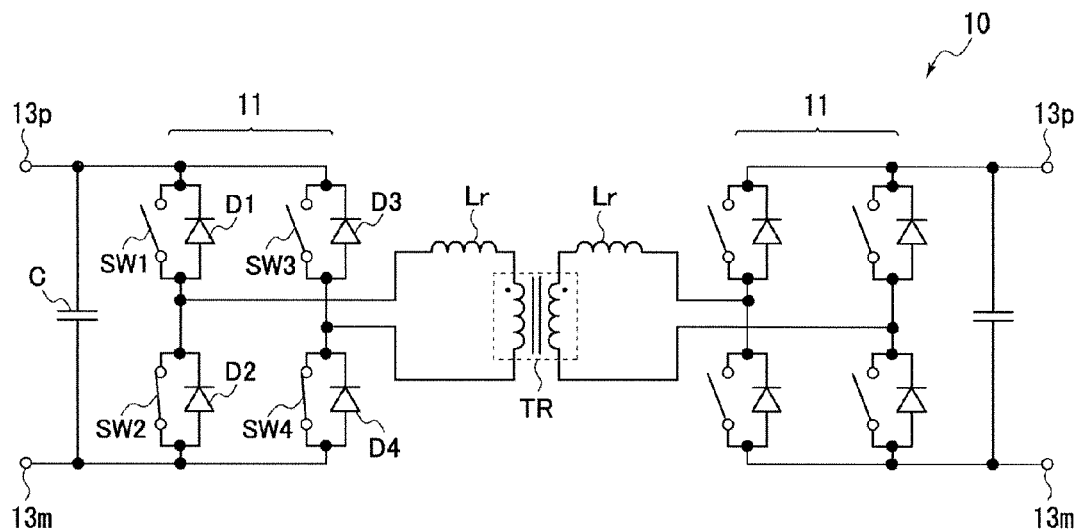
FIG. 5C is an explanatory diagram of the current paths of the primary side and the secondary side of the DC/DC converter following FIG. 5B.

The magnitude of the circulating current in state #2 decreases with the elapse of time (the movement of the energy stored in the first reactor to the secondary side). Therefore, when a certain time (time corresponding to the 0 value) has elapsed after the transition to state #2, as illustrated in FIG. 5C, a state where no circulating current flows is formed. When the original timing of transition to state #3 has been reached, in principle (when the load is not excessively large), the DC/DC converter 10 is configured to make the state be the state illustrated in FIG. 5C (i.e., so that the circulating current is "0"). Also, the original transition timing is a transition timing at which a timing adjustment function (of which details will be described below) provided in the control unit 20 does not operate.

Figure 5D:
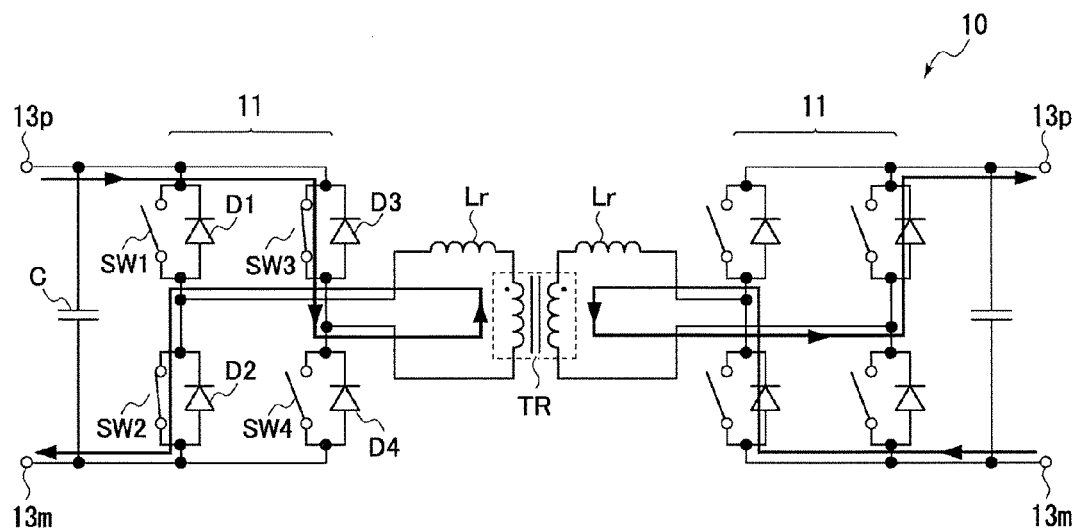
FIG. 5D is an explanatory diagram of the current paths of the primary side and the secondary side of the DC/DC converter following FIG. 5C.

When the state of the DC/DC converter 10 is state #3 (i.e., when SW2 and SW3 are ON), as illustrated in FIG. 5D, a current flows through a path of first input/output terminal 13p→third switching element SW3→transformer TR→first reactor→second switching element SW2→first input/output terminal 13m. In other words, a current flows through the first reactor in a direction opposite to that in a case in which the state of the DC/DC converter 10 is state #1 (FIG. 5A).

Accordingly, energy is stored in the first reactor (see FIG. 4) and energy is transmitted to the secondary side via the transformer TR, rectified by the second full bridge circuit 11, and output from the second input/output terminal 13.

Figure 5E:
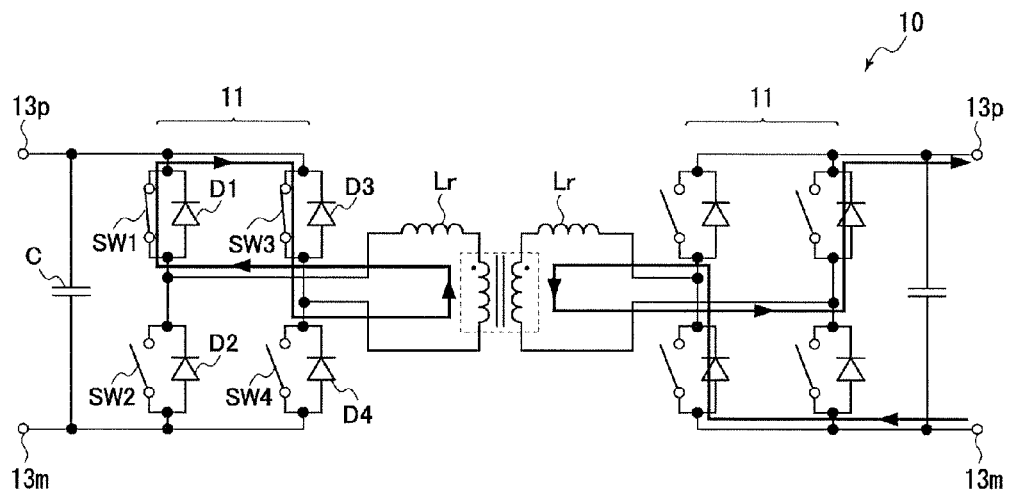
FIG. 5E is an explanatory diagram of the current paths of the primary side and the secondary side of the DC/DC converter following FIG. 5D.

When the primary side circuit of the DC/DC converter 10 transitions from state #3 to state #4, as illustrated in FIG. 5E, a current circulates along a path of third switching element SW3→transformer TR→first reactor→first switching element SW1 (and diode D1) according to the energy stored in the first reactor. Thus, the energy stored in the first reactor is transmitted to the secondary side.

Figure 5F:
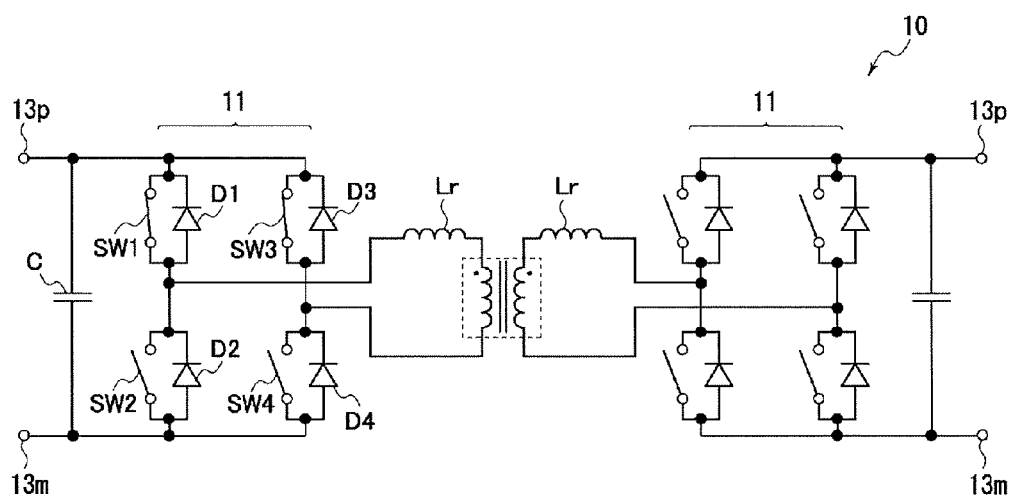
FIG. 5F is an explanatory diagram of the current paths of the primary side and the secondary side of the DC/DC converter following FIG. 5E.

The magnitude of the circulating current in this state #4 also decreases with the elapse of time. Therefore, when a certain time has elapsed after the transition to state #4, as illustrated in FIG. 5F, a state in which no circulating current flows is formed. Even when the original timing of transition from state #4 to state #1 has been reached, the DC/DC converter 10 is configured to make the state be a state illustrated in FIG. 5F (so that the circulating current becomes "0"), in principle.

As described above, when the original timing of transition from the state (state #2, state #4, or the like) in which the current circulates in the circuit on the primary side to a next state has been reached, the DC/DC converter 10 is configured so that the magnitude of the circulating current becomes "0." However, it is difficult to configure the DC/DC converter 10 so that the magnitude of the circulating current becomes "0" without degrading the performance of the power conversion device in all operation conditions of the power conversion device.

Figure 6:
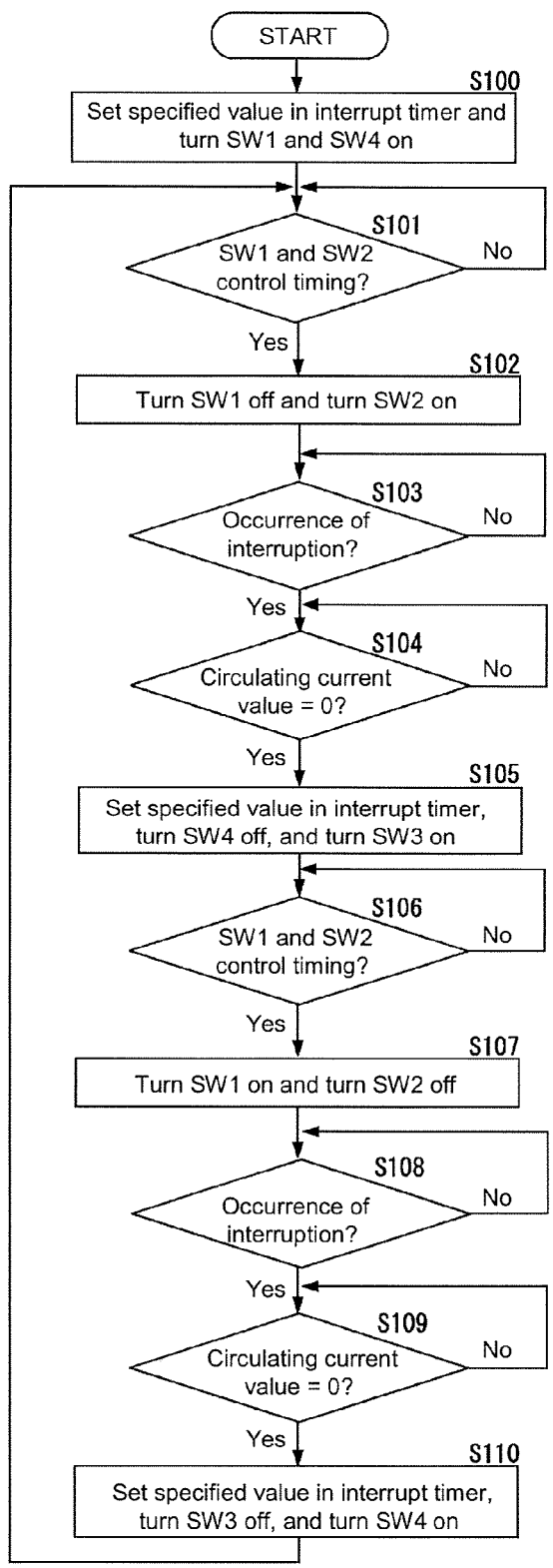
FIG. 6 is a flowchart of a step-down control process executed by the control unit.

Thus, when the control unit 20 (the microcontroller in the control unit 20) causes the DC/DC converter 10 to operate as the step-down converter whose first input/output terminal 13 side is the primary side, the control unit 20 is configured (programmed) so as to perform the step-down control process of the procedure illustrated in FIG. 6.

That is, the control unit 20 that started the step-down control process first performs a timer setting process of setting a specified value in an interrupt timer in step S100. Here, the interrupt timer is a timer that generates an interruption when a time according to a set value has elapsed. Also, a specified value is a value at which the interrupt timer will generate an interruption after the passage of a time T/2 (T is a period of the control signal: see FIG. 2) if the value is set.

Further, in step S100, the control unit 20 also performs a process of turning the first switching element SW1 and the fourth switching element SW4 ON by changing the levels of the control signals G1 and G4 to a high level.

Upon completion of the processing of step S100, the control unit 20 waits (monitors) an SW1 and SW2 control timing in step S101. Here, the SW1 and SW2 control timing is a timing determined by a 0 value to control (change) the ON/OFF states of the first switching element SW1 and the second switching element SW2. The processing of step S101 to be first executed after the start of the step-down control process may be performed irrespective of the 0 value (e.g., a process of determining that the SW1 and SW2 control timing has been reached when a predetermined time has elapsed from a time point at which step S100 was executed). Also, the processing of step S101 of the second and subsequent times may be a process of determining whether or not the SW1 and SW2 control timing has been reached on the basis of an elapsed time after the occurrence of an interruption or a process of determining whether or not the SW1 and SW2 control timing has been reached on the basis of an elapsed time after the first switching element SW1 was previously turned ON.

When the SW1 and SW2 control timing has been reached (step S101; YES), the control unit 20 changes the levels of the control signals G1 and G2 to turn the first switching element SW1 OFF and turn the second switching element SW2 ON (step S102). In this step S102, the control unit 20 assigns a time difference to ON/OFF of the first switching element SW1 and the second switching element SW2 to suppress a through-current. More specifically, the control unit 20 changes the level of the control signal G2 when a predetermined time has elapsed after a change in the level of the control signal G1.

Thereafter, the control unit 20 waits (monitors) the occurrence of an interruption in step S103. When the interruption has occurred (step S103; YES), the control unit 20 determines whether or not a circulating current value at the interruption time is "0" (step S104). In other words, the control unit 20 acquires the result of detection of the current value by the current sensor 15 provided on the primary side of the DC/DC converter 10, and determines whether or not the detection result is "0" (step S104).

It is unnecessary for the determination of step S104 to be a determination of whether or not the actual circulating current value is "0." It is necessary for the determination of step S104 to be a determination of whether or not the result of detection of the circulating current value from the control unit 20 depending on the performance or the like of the current sensor 15 is "0." Also, it is also conceivable that the circulating current value is not detected when the circulating current value has reached a value within a real current value range in which the result of detection of the circulating current value from the control unit 20 becomes "0" according to a detection cycle of the circulating current value and the circulating current value is detected after the circulating current value reaches a value outside the real current value range. Thus, as a determination of step S104, when the circulating current value has reached a value within the real current value range (when the result of detection of the circulating current value from the control unit 20 has reached "0") and when a sign of the circulating current value has inverted, a determination for determining that the circulating current value is "0" may be adopted.

When the circulating current value is "0" (step S104; YES), the control unit 20 sets a specified value in the interrupt timer (step S105). Also, the control unit 20 turns the fourth switching element SW4 OFF and turns the third switching element SW3 ON by changing the levels of the control signals G3 and G4 (step S105). Also, if the circulating current value has not reached "0" (step S104; NO), the control unit 20 iterates the processing of step S104 to wait for the circulating current value to reach "0" and then performs the processing of S105.

Also, in step S105 and steps S107 and S110 to be described later, similar to the execution of the above-described step S102, the control unit 20 assigns a time difference to ON/OFF of the two switching elements to suppress a through-current.

Upon completion of the processing of step S105, the control unit 20 waits (monitors) the SW1 and SW2 control timing (step S106). The SW1 and SW2 control timing in this step S106 is also a timing determined by the θ value and a Ton value to control (change) the ON/OFF states of the first switching element SW1 and the second switching element SW2. The processing of step S106 may be a process of determining whether or not the SW1 and SW2 control timing has been reached on the basis of the passage of time after the first switching element SW1 was previously turned OFF or a process of determining whether or not the SW1 and SW2 control timing has been reached on the basis of the elapse of time after the occurrence of an interruption.

When the SW1 and SW2 control timing has been reached (step S106; YES), the control unit 20 changes the levels of the control signals G1 and G2 to turn the first switching element SW1 ON and turn the second switching element SW2 OFF (step S107).

Thereafter, the control unit 20 waits for occurrence of an interruption in step S108. If the interruption has occurred (step S108; YES), the control unit 20 determines whether or not a circulating current value at an interruption time is "0" (step S109). Thus, as a determination of step S109, as in the determination of step S104, a determination of whether the circulating current value has reached a value within the real current value range (whether the result of detection of the circulating current value from the control unit 20 has reached "0") or a determination for determining that the circulating current value is "0" even when a sign of the circulating current value has been reversed can be adopted.

When the circulating current value is "0" (step S109; YES), the control unit 20 sets a specified value in the interrupt timer, turns the third switching element SW3 OFF, and turns the fourth switching element SW4 ON (step S110). Also, when the circulating current value has not reached "0," the control unit 20 waits for the circulating current value to reach "0," and then performs the processing of step S110.

Then, the control unit 20 that has completed the processing of step S110 resumes step S101 and the processing subsequent thereto.

Figure 7:
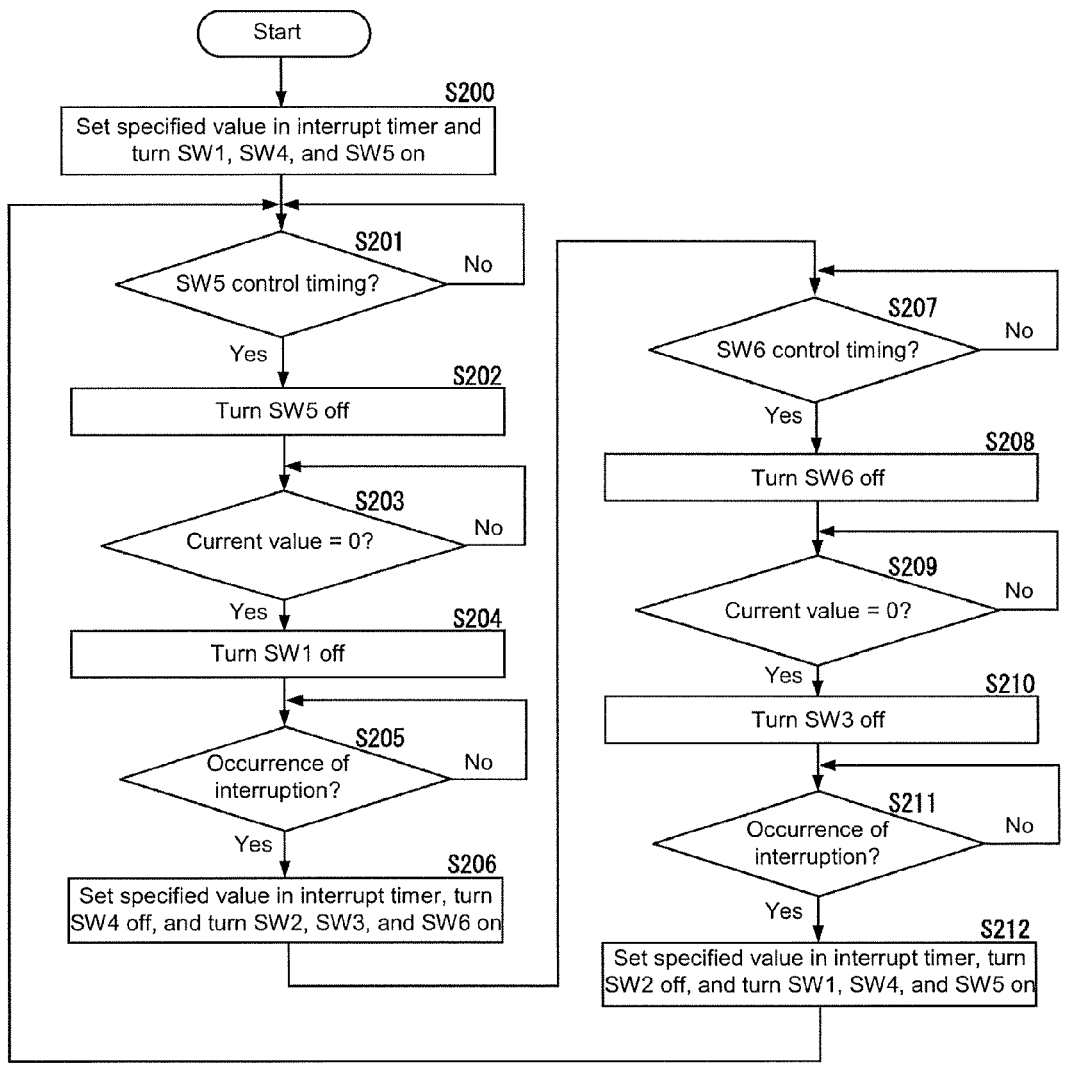
FIG. 7 is a flowchart of a step-up control processing executed by the control unit.

(2) When DC/DC converter 10 functions as step-up converter whose first input/output terminal 13 side is the primary side:

If the DC/DC converter 10 is operated as the step-up converter whose first input/output terminal 13 side is the primary side, the control unit 20 is configured (programmed) to perform the step-up control process of the procedure illustrated in FIG. 7.

In other words, the control unit 20 that started the step-up control process firstly sets a specified value in the interrupt timer (step S200). Also, in step S200, the control unit 20 performs a process of turning the first switching element SW1, the fourth switching element SW4, and the fifth switching element SW5 ON by changing the levels of the control signals G1, G4, and G5 to a high level.

The control unit 20 that has completed the processing of step S200 waits (monitors) an SW5 control timing in step S201. Here, the SW5 control timing is a timing determined by the Ton value and at which the fifth switching element SW5 is to be turned OFF.

If the SW5 control timing has been reached (step S201; YES), the control unit 20 turns the fifth switching element SW5 OFF by changing the level of the control signal G5 (step S202).

Thereafter, the control unit 20 determines whether or not a current value of the current flowing through the first reactor is "0" (step S203). In other words, the control unit 20 acquires the result of detection of the current value from the current sensor 15 provided on the primary side of the DC/DC converter 10, and determines whether or not the detection result is "0" (step S203). Also, in the determination of step S203, similar to the determinations of steps S103 and S109 described above, a determination of whether the current value has reached a value within the real current value range or a determination for determining that the current value is "0" even when a sign of the current value has inverted may also be adopted.

When the current value has not reached "0" (step S203; NO), the control unit 20 iterates the processing (determination) of step S203. If the current value has reached "0" (step S203; YES), the control unit 20 turns the first switching element SW1 OFF (step S204). Next, the control unit 20 waits for occurrence of an interruption (step S205). If the interruption has occurred (step S205; YES), the control unit 20 sets a specified value in the interruption timer, turns the fourth switching element SW4 OFF, and turns the second switching element SW2, the third switching element SW3, and the sixth switching element SW6 ON (step S206). Also, if the interruption has already occurred during the execution of step S203 (or step S204), the control unit 20 performs the processing of step S206 without waiting for the occurrence of the interruption in step S205.

The control unit 20 that has completed the processing of step S206 waits (monitors) an SW6 control timing in step S207. Here, the SW6 control timing is a timing determined by the Ton value and at which the sixth switching element SW6 is to be turned OFF.

When the SW6 control timing has been reached (step S207; YES), the control unit 20 turns the sixth switching element SW6 OFF by changing the level of the control signal G6 (step S208).

Thereafter, the control unit 20 determines whether or not the current value of the current flowing through the first reactor is "0" (step S209). A determination of step S209 may also be a determination of whether the current value has reached the value within the real current value range (whether the result of detection of the current value from the control unit 20 has reached "0") or a determination for determining that the circulating current value is "0" even when a sign of the current value has inverted.

If the current value has not reached "0" (step S209; NO), the control unit 20 iterates the processing (determination) of step S209. If the current value has reached "0" (step S209; YES), the control unit 20 turns the third switching element SW3 OFF (step S210). Next, the control unit 20 waits for occurrence of an interruption (step S211). If the interruption has occurred (step S211; YES), the control unit 20 sets a specified value in the interruption timer, turns the second switching element SW2 OFF, and turns the first switching element SW1, the fourth switching element SW4, and the fifth switching element SW5 ON (step S212). If the interruption has already occurred during the execution of step S209 (or step S210), the control unit 20 performs the processing of step S212 without waiting for the occurrence of the interruption in step S211.

Then, the control unit 20 that has completed the processing of step S212 resumes a process of moving to step S201.

Hereinafter, details of the step-up control process will be more specifically described.

Figure 8:
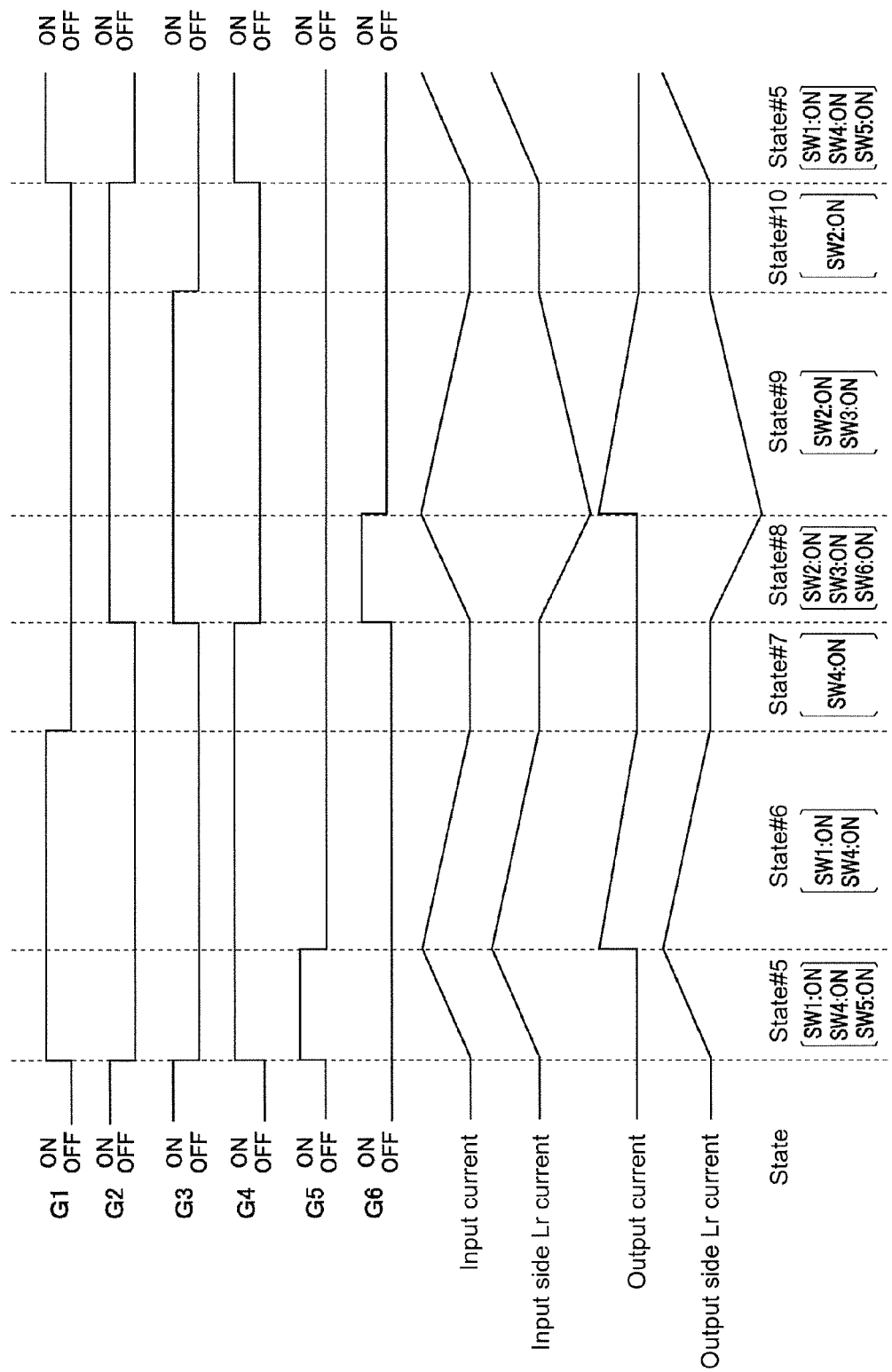
FIG. 8 is a time chart illustrating changes in currents flowing through parts of the DC/DC converter with respect to time when the control unit causes the DC/DC converter to function as a step-up converter whose first input/output terminal side is the primary side together with changes in control signals G1 to G6 with respect to time.

FIG. 8 illustrates changes in currents flowing through parts of the DC/DC converter 10 with respect to time when the control unit 20 causes the DC/DC converter 10 to function as a step-up converter whose first input/output terminal 13 side is the primary side together with changes in control signals G1 to G6 with respect to time. Also, FIGS. 9A to 9F are explanatory diagrams of current paths of a primary side and a secondary side of the DC/DC converter 10 when the control unit 20 causes the DC/DC converter 10 to function as the step-up converter whose first input/output terminal 13 side is the primary side.

When the step-up control process of the above-described details is performed, the state of the DC/DC converter 10 iteratively transitions between the following six states in the order of state #5, state #6, state #7, state #8, state #9, and state #10 (see FIG. 8).

State #5: a state in which the first switching element SW1, the fourth switching element SW4, and the fifth switching element SW5 are ON.

State #6: a state in which the first switching element SW1 and the fourth switching element SW4 are ON.

State #7: a state in which the fourth switching element SW4 is ON.

State #8: a state in which the second switching element SW2, the third switching element SW3, and the sixth switching element SW6 are ON.

State #9: a state in which the second switching element SW2 and the third switching element SW3 are ON.

State #10: a state in which the second switching element SW2 is ON.

Figure 9A:
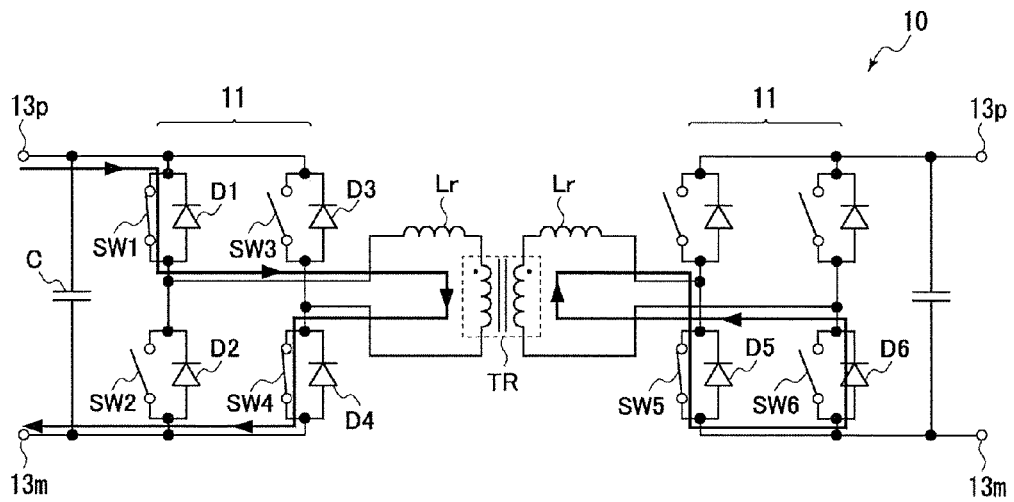
FIG. 9A is an explanatory diagram of current paths of a primary side and a secondary side of a DC/DC converter when the control unit causes the DC/DC converter to function as a step-up converter whose first input/output terminal side is the primary side.

When the state of the DC/DC converter 10 is state #5 (i.e., when SW1, SW4, and SW5 are ON), as illustrated in FIG. 9A, a current flows through a path of first input/output terminal 13p→first switching element SW1→first reactor→transformer TR→fourth switching element SW4→first input/output terminal 13m. Accordingly, energy is stored in the first reactor and the input side Lr current rises as illustrated in FIG. 8. Also, energy is transmitted to the secondary side via the transformer TR. However, because the fifth switching element SW5 of the second full bridge circuit 11 is ON, as illustrated in FIG. 9A, a current circulates along a path of diode D6→transformer TR→second reactor→fifth switching element SW5 on the secondary side of the DC/DC converter 10 in state #5. Accordingly, energy from the primary side is not output from the second input/output terminal 13, but stored in the second reactor.

Figure 9B:
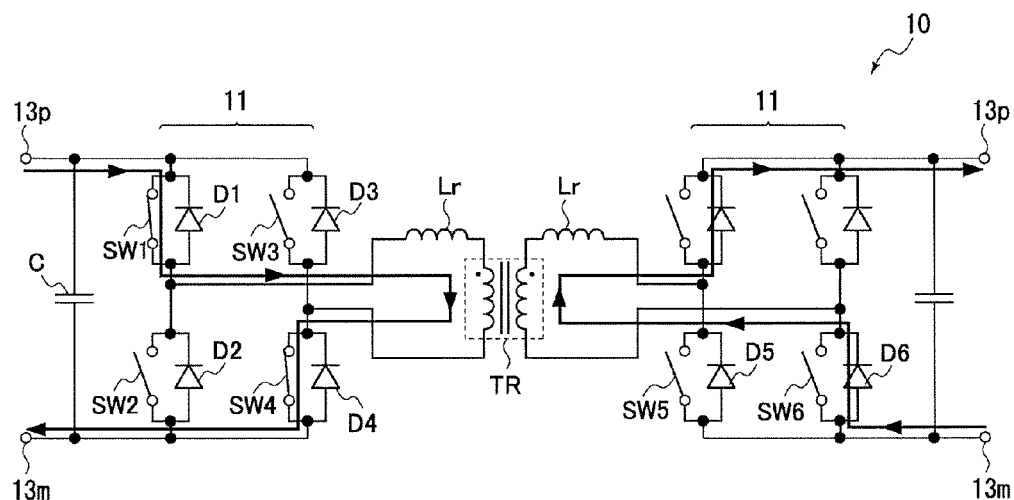
FIG. 9B is an explanatory diagram of current paths of the primary side and the secondary side of the DC/DC converter following FIG. 9A.

When the fifth switching element SW5 is OFF and the state of the DC/DC converter 10 becomes state #6, as illustrated in FIG. 9B, the energy stored in the first reactor and the energy from a power supply are transmitted to the secondary side and the current rectified by the second full bridge circuit 11 is output from the second input/output terminal 13.

Figure 9C:
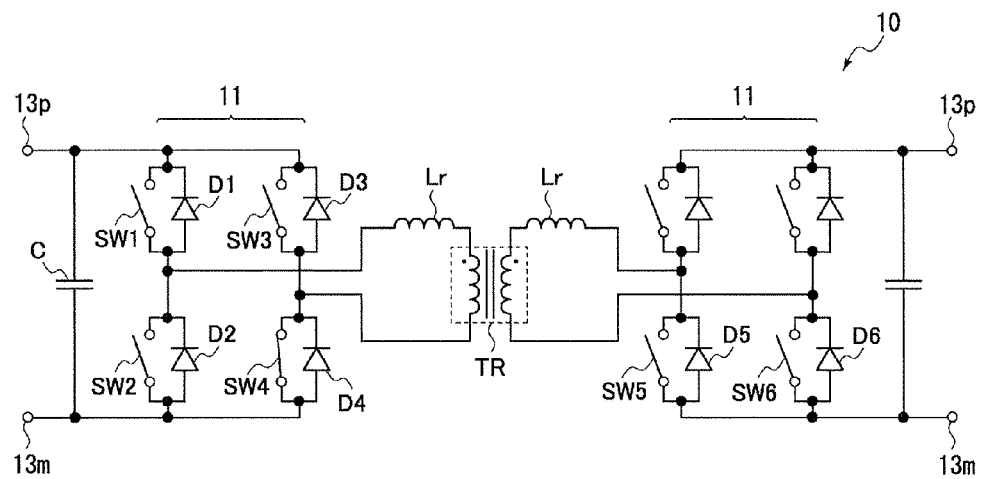
FIG. 9C is an explanatory diagram of the current paths of the primary side and the secondary side of the DC/DC converter following FIG. 9B.

Because an output voltage of a load is applied to the second input/output terminal 13, the input current, the input side Lr current, and the output current gradually decrease if the state of the DC/DC converter 10 is state #6. If the current "0" is detected in step S203 (FIG. 7), the first switching element SW1 is OFF and the state of the DC/DC converter 10 transitions to state #7, so that a state in which no current flows through each part of the DC/DC converter 10 is formed as illustrated in FIG. 9C.

Figure 9D:
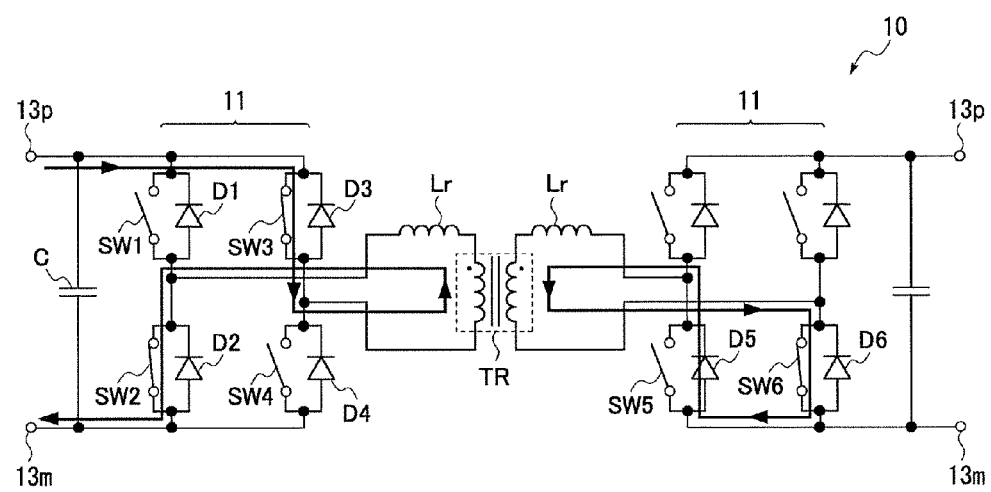
FIG. 9D is an explanatory diagram of the current paths of the primary side and the secondary side of the DC/DC converter following FIG. 9C.

When the state of the DC/DC converter 10 transitions from state #7 to state #8, as illustrated in FIG. 9D, a current flows through a path of first input/output terminal 13p→third switching element SW3→transformer TR→first reactor→second switching element SW2→first input/output terminal 13m. Accordingly, energy is stored in the first reactor (see FIG. 8), and energy is transmitted to the secondary side via the transformer TR. However, because the sixth switching element SW6 is ON, as illustrated in FIG. 9D, a current circulates along a path of diode D5→second reactor→transformer TR→sixth switching element SW6 on the secondary side of the DC/DC converter 10. Accordingly, in state #8, the energy from the primary side is stored in the second reactor.

Figure 9E:
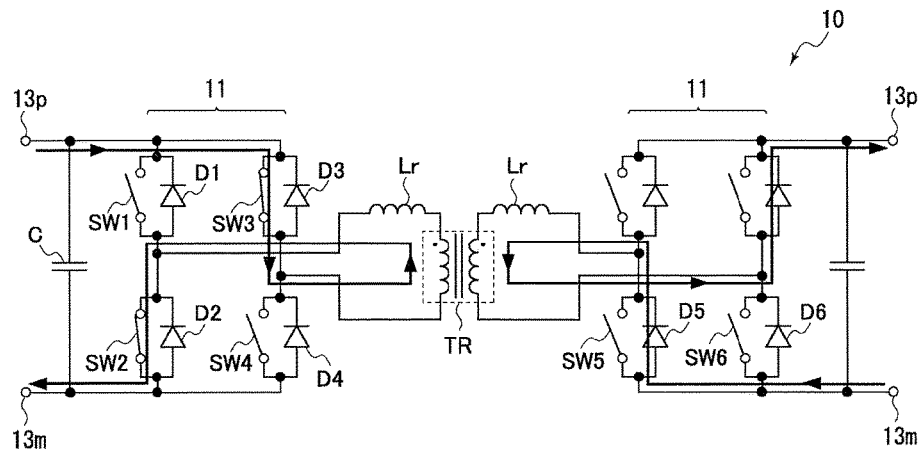
FIG. 9E is an explanatory diagram of the current paths of the primary side and the secondary side of the DC/DC converter following FIG. 9D.

If the sixth switching element SW6 is OFF and the state of the DC/DC converter 10 is shifted to state #9, energy stored in the second reactor and energy from the power supply are transmitted to the secondary side and a current rectified by the second full bridge circuit 11 is output from the second input/output terminal 13 as illustrated in FIG. 9E.

Figure 9F:
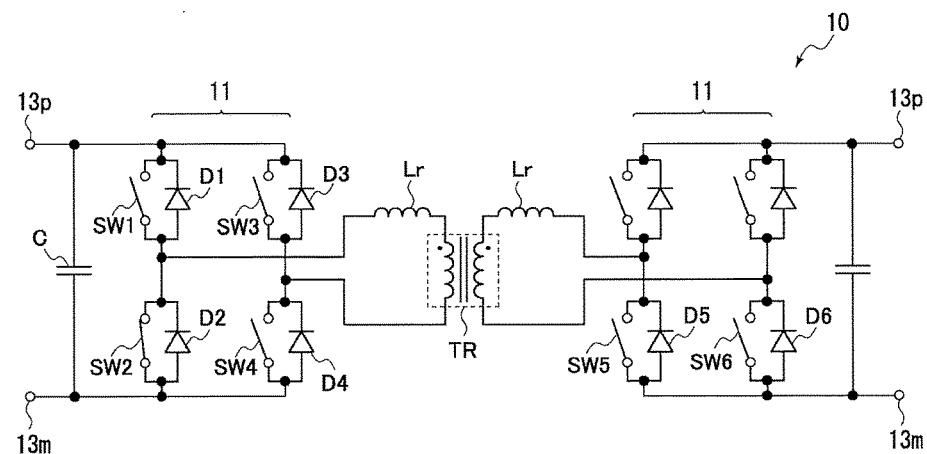
FIG. 9F is an explanatory diagram of the current paths of the primary side and the secondary side of the DC/DC converter following FIG. 9E.

An output voltage of a load is applied to the second input/output terminal 13. Therefore, an input current, an input Lr current, and an output current in state #9 gradually decrease. Then, when the current "0" is detected in step S209 (FIG. 7), the third switching element SW3 is turned OFF to be in state #10. Accordingly, when the state of the DC/DC converter 10 becomes state #10, as illustrated in FIG. 9F, a state in which no current flows through each part of the DC/DC converter 10 (each winding of the transformer or the like) is formed.

As described above, in the power conversion device according to the present embodiment, the transition from the second state to the third state and the transition from the fourth state to the first state are performed when the magnitude of the current circulating along a path including the reactor on the primary side in a step-up time has reached "0." Also, in the step-up time, the state of the DC/DC converter 10 sequentially transitions between six states including a seventh state and a tenth state in which no current is input from the input/output terminal 13 functioning as an input terminal and no current is output from the input/output terminal 13 functioning as an output terminal. Accordingly, in the power conversion device according to the present embodiment, when the power transmission direction is switched (when the input terminal pair is changed from the pair of first input/output terminals 13 to the pair of second input/output terminals 13 and when the input terminal pair is changed from the pair of second input/output terminals 13 to the pair of first input/output terminals 13), it is unnecessary to wait for the current flowing through each winding of the transformer TR to be "0." Consequently, according to the power conversion device according to the present embodiment, the power transmission direction can be switched at a higher speed (in a shorter time) than in a conventional power conversion device.

Second Embodiment

As in the power conversion device according to the first embodiment, if various state transitions (such as transition from the second state to the third state) are performed after the magnitude of the current flowing through the reactor Lr of the input side (hereinafter referred to as the input side Lr current value) reaches "0," it is possible to switch the power transmission direction at a high speed.

However, it is difficult to accurately detect that an input side Lr current value has reached "0" in the situation where the input side Lr current value is generally low. Thus, when the power conversion device according to the first embodiment is operated under a condition of such a situation as described above, power conversion may not be performed normally.

The power conversion device according to the second embodiment of the present invention is an improvement on the power conversion device according to the first embodiment in which the occurrence of the above-described malfunction can be prevented.

Figure 10:
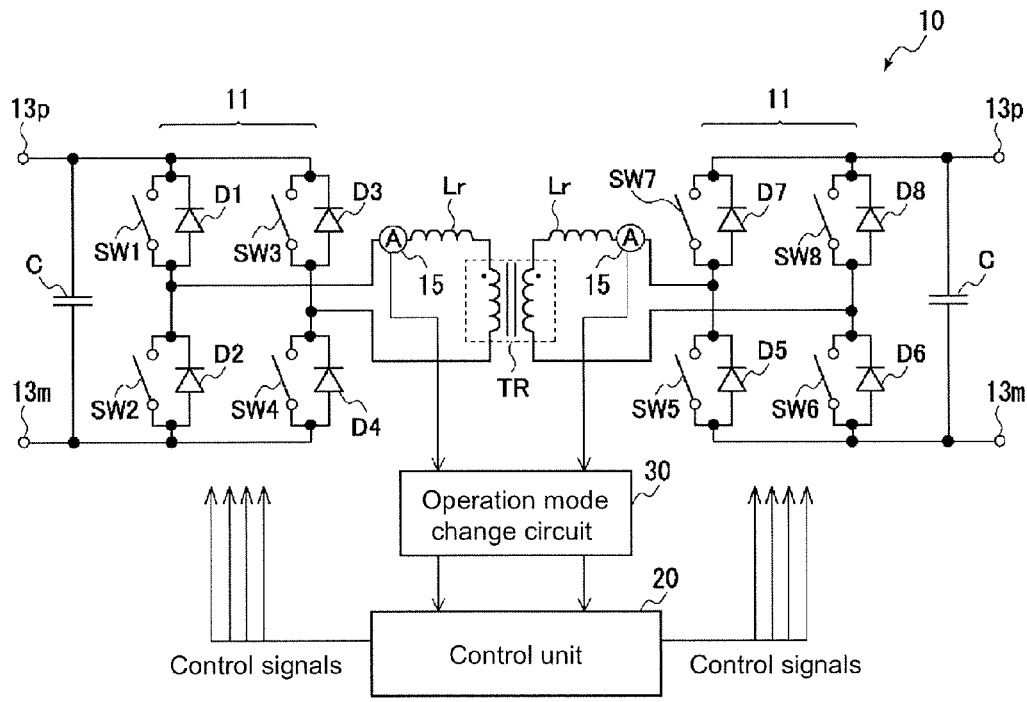
FIG. 10 is a schematic configuration diagram of a power conversion device according to a second embodiment of the present invention.

FIG. 10 illustrates a configuration of the power conversion device according to the second embodiment.

As illustrated in FIG. 10, the power conversion device according to the present embodiment has a configuration in which an operation mode change circuit 30 is inserted between the two current sensors 15 and the control unit 20 of the power conversion device (see FIG. 1) according to the first embodiment.

The operation mode change circuit 30 is a circuit having the following functions.

If the DC/DC converter 10 is operated in a state in which the predetermined condition is not satisfied, a signal output from each current sensor 15 is supplied to the control unit 20 as it is.

If the DC/DC converter 10 is operated in a state in which the predetermined condition is satisfied, a signal indicating that the input side Lr current value is "0" instead of the output of each current sensor 15 is output to the control unit 20.

Here, the predetermined condition is a condition predetermined as a condition that it is difficult to accurately detect that the input side Lr current value has reached "0." As this predetermined condition, for example, a condition that "the input side Lr current value is less than or equal to a predetermined current threshold value at the detection timing of the current value "0" and the voltage value applied to the input side reactor is less than or equal to a predetermined voltage threshold value" can be adopted. The detection timing of the current value "0" refers to the execution timing of steps S104, S203, and the like.

The operation mode change circuit 30 only has to have the above-described functions. Accordingly, the operation mode change circuit 30 may be a circuit for selecting a signal to be supplied to the control unit 20 on the basis of a digital signal or an analog signal from an external device (a device outside the control unit 20 or the power conversion device), which indicates whether or not the predetermined condition is satisfied.

Also, when the input side Lr current value at the detection timing of the current value "0" is a value corresponding to the input voltage and the output voltage of the DC/DC converter 10 and the turn ratio of the transformer TR, and the turn ratio of the transformer TR is 1:1, the input side Lr current value decreases as the difference between the input voltage and the output voltage decreases. The voltage value applied to the input side reactor also becomes a value corresponding to the difference between the input voltage and the output voltage of the DC/DC converter 10.

Figure 11:
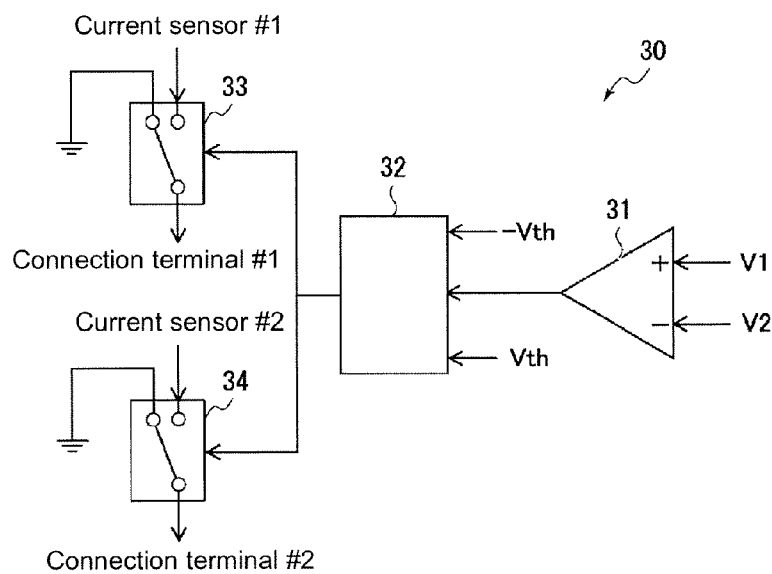
FIG. 11 is an explanatory diagram of a configuration example of a current value change circuit.

Accordingly, when the turn ratio of the transformer TR is 1:1, a circuit in which a differential amplifier 31, a window comparator 32, and two multiplexers 33 and 34 are combined can be used as the operation mode change circuit 30 as illustrated in FIG. 11. More specifically, the differential amplifier 31 provided in the operation mode change circuit 30 is a circuit that amplifies a difference between a voltage V1 of the first input/output terminal 13 and a voltage V2 of the second input/output terminal 13. The window comparator 32 is a circuit that outputs a voltage signal of a first level when the output voltage of the differential amplifier 31 falls within a range of −Vth to Vth and outputs a voltage signal of a second level otherwise. Also, the value of Vth which is a threshold voltage is determined on the basis of an amplification factor of the differential amplifier 31, the above-described specified value, and the like.

Multiplexers 33 and 34 are two-input multiplexers. As illustrated, the multiplexer 33 is connected to a current sensor #1, the ground, and a connection terminal #1, and the multiplexer 34 is connected to a current sensor #2, the ground, and a connection terminal #2. Here, the current sensor #1 is one of the two current sensors 15, and the current sensor #2 is the other current sensor 15 of the two current sensors 15. Also, the connection terminals #1 and #2 are terminals for connecting the current sensors #1 and #2 provided in the control unit 20, respectively.

When a level of a voltage signal from the window comparator 32 is a first level, the multiplexer 33 supplies an output of the current sensor #1 to the connection terminal #1. Otherwise, the connection terminal #1 is connected to the ground (that is, 0 V indicating that the current value is "0" is supplied to the connection terminal #1). Likewise, when the level of the voltage signal from the window comparator 32 is the first level, the multiplexer 34 supplies the output of the current sensor #2 to the connection terminal #2. Otherwise, the connection terminal #2 is connected to the ground.

As described above, in the power conversion device according to the second embodiment, when the input side Lr current value is generally low, the control unit 20 is notified that the input side Lr current value is "0." Accordingly, the power conversion device according to the second embodiment functions as a device that does not malfunction even when the input side Lr current value is generally low.

Modified Embodiments

The power conversion device according to the above-described embodiment can have various modifications. For example, it is only necessary for the power conversion device to have a function of converting a voltage within the first range applied between the first input/output terminals 13 into a voltage within the second range and outputting the voltage from the second input/output terminal 13 and a function of converting a voltage within the second range applied between the second input/output terminals 13 into a voltage within the first range and outputting the voltage from the first input/output terminal 13. Therefore, according to a combination of the first range and the second range, a unit having only a function of causing the DC/DC converter 10 to operate as a step-up (or step-down) converter whose first input/output terminal 13 side is the primary side or a step-down (or step-up) converter whose second input/output terminal 13 side is the primary side may be adopted as the control unit 20.

Also, a DC/DC converter in which the magnitude of the circulating current is "0" when the original timing of transition from the state where the current circulates in the primary side circuit to the next state in all operation conditions of the power conversion device has been reached may be adopted as the DC/DC converter 10, so that the timing adjustment function may be removed from the control unit 20. However, because it is difficult to configure the DC/DC converter 10 so that the magnitude of the circulating current becomes "0" without deteriorating the performance of the power conversion device in all operation conditions of the power conversion device, it is preferable that a timing adjustment function be assigned to the control unit 20 as described above.

Also, the control procedure of the DC/DC converter 10 by the control unit 20 need not be the same as that described above. For example, although the control unit 20 ascertains a control timing with a so-called software interruption, the control unit 20 that ascertains a control timing by a hardware interruption and re-sets the hardware interruption when it waits for a circulating current to be "0" may be adopted.

What is claimed is:
1. A power conversion device, comprising:
a first input/output terminal pair;
a second input/output terminal pair;
a DC/DC converter connected to the first input/output terminal pair and the second input/output terminal pair; and
a control unit configured to control the DC/DC converter, wherein the DC/DC converter comprises:
a first switching leg having first and second switching elements connected in series via a first connection point and connected to the first input/output terminal pair;
a second switching leg having third and fourth switching elements connected in series via a second connection point and connected in parallel to the first switching leg;
a third switching leg having fifth and seventh switching elements connected in series via a third connection point and connected to the second input/output terminal pair;
a fourth switching leg having sixth and eighth switching elements connected in series via a fourth connection point and connected in parallel to the third switching leg;
a first energy storage and conversion unit connected to the first connection point and the second connection point and connected to one winding of a transformer and a first reactor connected in series; and
a second energy storage and conversion unit connected to the third connection point and the fourth connection point and connected to the other winding of the transformer and a second reactor connected in series,
wherein the control unit is able to execute a first control for causing the DC/DC converter to convert a voltage within a first range applied to the first input/output terminal pair into a voltage within a second range and to output the voltage within the second range from the second input/output terminal pair and a second control for causing the DC/DC converter to convert a voltage within the second range applied to the second input/output terminal pair into a voltage within the first range and to output the voltage within the first range from the first input/output terminal pair,
wherein the first control is a control for controlling ON/OFF of each switching element in the DC/DC converter so that a state of the DC/DC converter iteratively transitions between, in an order of, a first state in which a current input from the first input/output terminal pair flows through the first reactor, a second state in which a current is able to circulate along a path including the first reactor, a third state in which the current input from the first input/output terminal pair flows through the first reactor in a direction opposite to a direction in the first state, and a fourth state in which a current is able to circulate along a path including the first reactor while flowing through the first reactor in a direction opposite to a direction in the second state, and
wherein a transition from the second state to the third state and a transition from the fourth state to the first state are configured to be performed when a magnitude of a current circulating along the path including the first reactor has reached "0".

2. The power conversion device according to claim 1, wherein the first control is a control for causing the state of the DC/DC converter to transition from the second state to the third state after the magnitude of the current reaches "0" if the magnitude of the current circulating along the path including the first reactor has not reached "0" when the state of the DC/DC converter is to be transitioned from the second state to the third state and causing the state of the DC/DC converter to transition from the fourth state to the first state after the magnitude of the current reaches "0" if the magnitude of the current circulating along the path including the first reactor has not reached "0" when the state of the DC/DC converter is to be transitioned from the fourth state to the first state.

3. The power conversion device according to claim 2,
wherein the control unit comprises an input terminal to which a signal indicating the magnitude of the current flowing through the first reactor is input, and
wherein the power conversion device further comprises:
a current value change unit configured to supply an output of a current sensor for measuring the magnitude of the current flowing through the first reactor to the input terminal of the control unit when a predetermined condition defined in advance as a condition that it is difficult to accurately detect that the magnitude of the current flowing through the first reactor has reached "0" is not satisfied and supply a signal indicating that the magnitude of the current flowing through the first reactor is "0" to the input terminal of the control unit if the predetermined condition is satisfied.

4. The power conversion device according to claim 3, wherein the current value change unit comprises:
a control signal output circuit configured to output a control signal indicating whether or not the predetermined condition is satisfied on the basis of a value of a voltage input to the first input/output terminal pair and a value of a voltage output from the second input/output terminal pair, and
a multiplexer configured to supplying one of an output of the current sensor and a signal indicating that the magnitude of the current flowing through the first reactor is "0" according to the control signal to the input terminal of the control unit.

* * * * *